United States Patent [19]

Torii et al.

[11] Patent Number: 5,107,716
[45] Date of Patent: * Apr. 28, 1992

[54] HORIZONTAL REVOLUTE ROBOT

[75] Inventors: Nobutoshi Torii, Tokyo; Susumu Ito, Yamanashi; Masayuki Hamura, Yamanashi; Akira Tanaka, Yamanashi, all of Japan

[73] Assignee: Fanuc Ltd., Minamitsuru, Japan

[*] Notice: The portion of the term of this patent subsequent to Mar. 31, 2009 has been disclaimed.

[21] Appl. No.: 474,040

[22] PCT Filed: Aug. 11, 1989

[86] PCT No.: PCT/JP89/00820
§ 371 Date: Apr. 11, 1990
§ 102(e) Date: Apr. 11, 1990

[87] PCT Pub. No.: WO90/01403
PCT Pub. Date: Feb. 22, 1990

[30] Foreign Application Priority Data

Aug. 11, 1988 [JP] Japan .................. 63-198818

[51] Int. Cl.⁵ .................. F16H 25/20; B25J 11/00
[52] U.S. Cl. .................. 74/89.15; 384/296; 384/439; 403/71; 403/353; 414/744.6; 901/16; 901/17
[58] Field of Search .................. 901/17, 25, 16; 74/89.15; 384/296, 439; 403/71, 353; 414/744.6

[56] References Cited

U.S. PATENT DOCUMENTS

| 4,502,830 | 3/1985 | Inaba et al. | 414/735 |
| 4,628,974 | 12/1986 | Meyer | 141/129 |
| 4,637,771 | 1/1987 | Yasukawa | 414/590 |
| 4,652,204 | 3/1987 | Arnett | 414/751 |
| 4,725,191 | 2/1988 | Eberle et al. | 414/744 A |
| 4,781,517 | 11/1988 | Pearce et al. | 414/590 |
| 4,782,713 | 11/1988 | Torii et al. | 74/89.15 |

FOREIGN PATENT DOCUMENTS 2085185 1/1970 France .................. 901/17

Primary Examiner—Allan D. Herrmann
Attorney, Agent, or Firm—Staas & Halsey

[57] ABSTRACT

In a horizontal revolute robot, an upper end of a ball screw (21) of a direct-acting actuator (100) is rotatably supported by a top plate of a column (10), and the lower end thereof is coupled to a drive unit (40) disposed on a base plate of the column. A first link (220) is pivotally coupled to a coupling member (210) of a manipulator (200) fixed to a slider (30) of the actuator, and a second link (240) is pivotally coupled to the first link. The ball screw is rotated by the drive unit to move the manipulator along the ball screw in unison with the slider, and servomotors (230, 250) of the manipulator are driven to turn both the links within a horizontal plane, so that a wrist portion of the robot is positioned in a robot installation space for robot operation. Since no base is required to turnably support the actuator, the robot is small-sized, light in weight, and low-priced. Since the lower movement limit position of the manipulator is low, the range of action of the robot is wide.

5 Claims, 3 Drawing Sheets

HORIZONTAL REVOLUTE ROBOT

BACKGROUND OF THE INVENTION

Technical Field

1. Field of the Invention:

The present invention relates to a horizontal revolute robot small-sized, light in weight, enjoying a wide range of action, and low-priced.

2. Description of the Related Art:

It is generally known to employ a cylindrical coordinate robot for material handling, transportation of heavy objects, etc. The cylindrical coordinate robot, having a first direct-acting or prismatic actuator disposed on a base for swivel motion and extending vertically of the robot and a second direct-acting actuator extending horizontally, is arranged to move the second actuator in the vertical direction by means of the first actuator, and drive an arm in the horizontal direction by the second actuator, so as to permit an end effector attached to the arm to perform various operations. Thus, the cylindrical coordinate robot has advantages such as high repeatability. However, the base thereof is large-sized, and the first actuator must be coupled to a drive mechanism accomodated in the base, so that the assembly, maintenance, and transportation of the robot require much labor, thus entailing higher costs, and requiring a wide robot installation space. Also, since the lower movement limit position of the second actuator is high, the range of action of the robot is narrow.

SUMMARY OF THE INVENTION

An object of the present invention is to provide a horizontal revolute robot which eliminates the aforementioned drawbacks of the conventional cylindrical coordinate robot, which is small-sized and light in weight, has a wide range of action, and permits reduction in costs of manufacture, assembly, maintenance, and transportation.

In order to achieve the above and other objects, a horizontal revolute robot according to the present invention comprises a direct-acting actuator and a manipulator including at least one horizontal revolute joint and arranged for swivel motion within a horizontal plane. The direct-acting actuator includes a feed screw extending vertically of the robot, a column including an upper plate member rotatably supporting the feed screw at an upper end of the feed screw and a lower plate member spaced vertically of the robot from the upper plate member, a drive unit disposed on the lower plate member and coupled to a lower end of the feed screw for rotating the feed screw, and a slider coupled to the feed screw and movable along the feed screw with rotation of the feed screw. The manipulator is coupled at its proximal end portion to the slider so as to be movable in unison therewith vertically of the robot.

According to the present invention, as described above, the manipulator swivelable within a horizontal plane is vertically movable in unison with the slider of the direct-acting actuator, so that there is no need of elements which correspond to the large-sized base and the drive mechanism accommodated therein of the conventional cylindrical coordinate robot. As a result, the robot can be made compact in size, light in weight, and simple in construction. Thus, the assembly, disassembly, and transportation of the robot are facilitated, costs of manufacture, assembly, maintenance, and transportation can be reduced, and the reliability can be improved.

Further, there is no need of a wide robot installation space. Furthermore, the lower movement limit position of the manipulator is low, so that the range of action of the robot is wide.

DETAILED DESCRIPTION OF THE PREFERRED EMBODIMENTS

Figure 4:
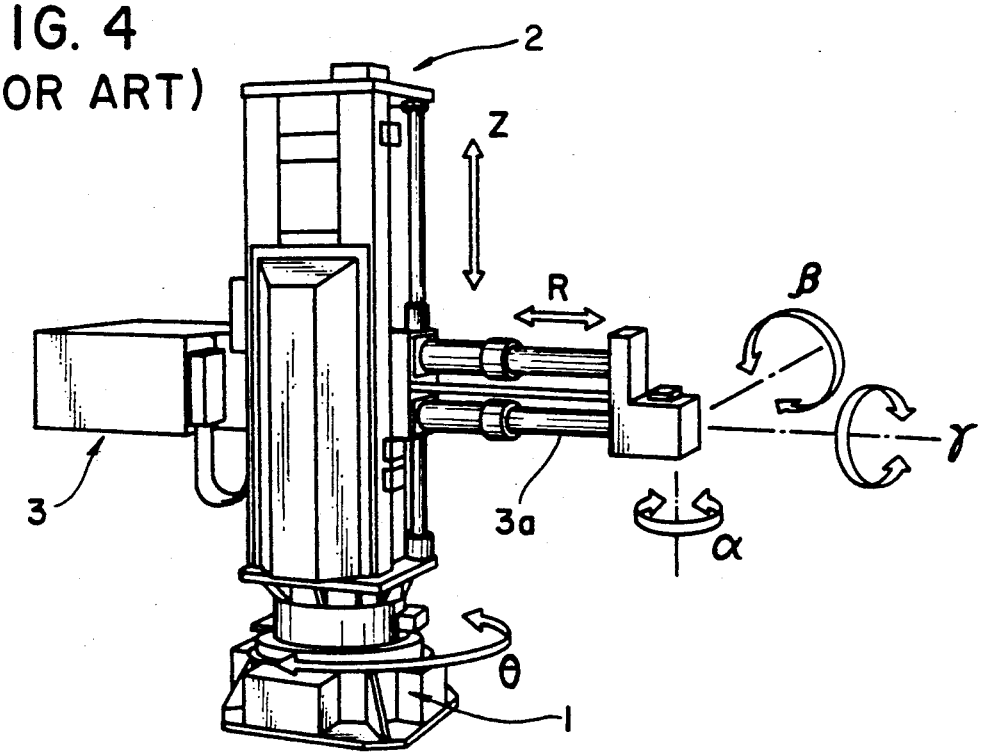
FIG. 4 is a schematic perspective view showing a conventional cylindrical coordinate robot.
Figure 5:
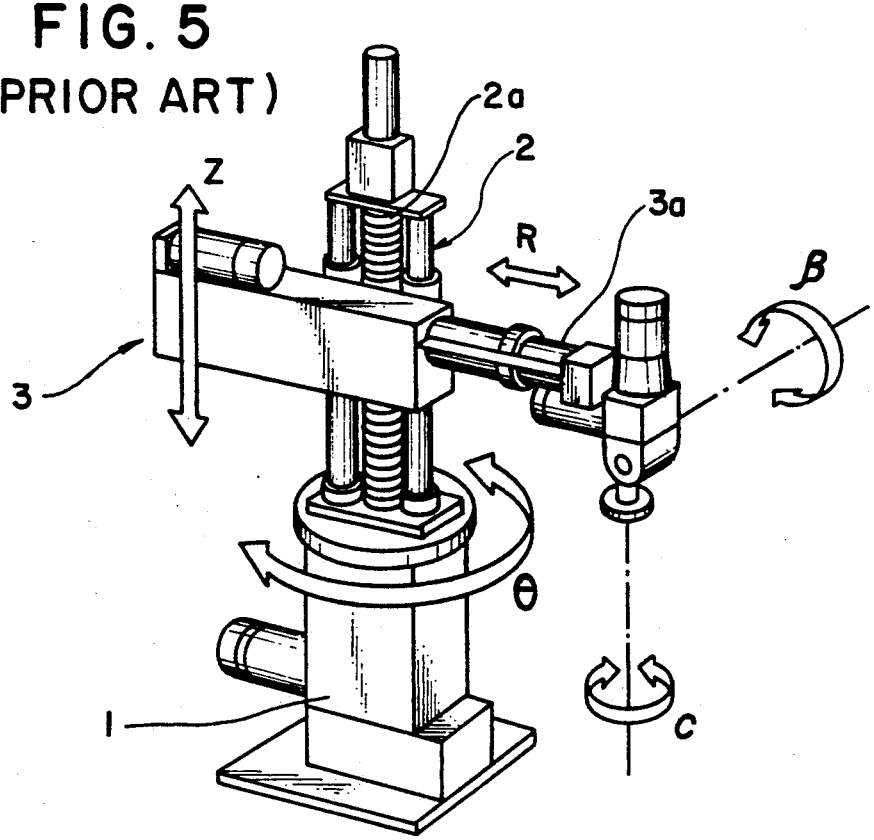
FIG. 5 is a schematic perspective view showing another conventional cylindrical coordinate robot.

Referring first to FIGS. 4 and 5, a conventional cylindrical coordinate robot will be described in brief.

The conventional cylindrical coordinate robot comprises a base 1, a first direct-acting actuator 2 disposed on the base for swivel motion, and a second actuator 3 driven vertically by the foregoing actuator. The first actuator 2 is turned around a swivel axis ($\theta$-axis) by means of a drive mechanism accommodated in the base 1 so that a feed screw 2a of the first actuator 2 is rotated to move the second actuator 3 along a first translation axis (Z-axis), and an arm 3a is driven along a second translation axis (R-axis) by means of the second actuator 2. In the drawings, symbols $\alpha$, $\beta$ and $\gamma$ designate swivel axes of a wrist portion attached to the distal end of the arm 3a.

The base 1 must have a mechanical strength high enough to support the first and second actuators 2 and 3, an object to be transported, etc., and should be able to contain the drive mechanism, so that its external dimensions and weight are substantial. Further, it is necessary to support the feed screw 2a of the first actuator for rotation by means of the base 1, and couple the screw and the drive mechanism to each other. Consequently, a wide robot installation space is needed, and the assembly, maintenance, and transportation of the robot require much labor, so that the cost increases. Since the lower movement limit position of the second actuator 3 is high, moreover, it is difficult to move the arm 3a close to the floor surface, and the range of action of the robot is narrow.

Figure 1:
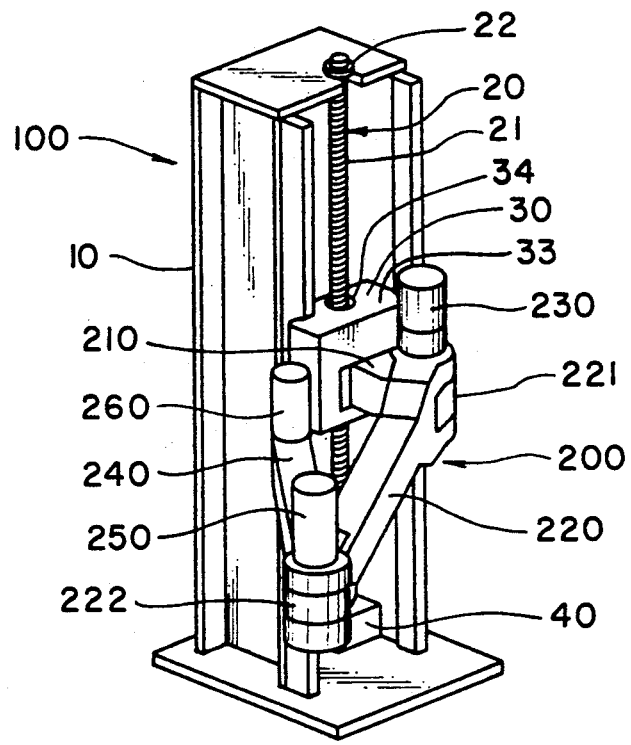
FIG. 1 is a schematic perspective view showing a horizontal revolute robot according to one embodiment of the present invention.

Referring to FIG. 1, a horizontal revolute (jointed cylindrical coordinate) robot, according to one embodiment of the present invention, is arranged to perform transportation operations, for example. The robot comprises a direct-acting or prismatic actuator 100 and a series-connected manipulator 200 arranged to be moved vertically of the robot by means of the actuator. The actuator 100 is so arranged as to cause a slider 30 to reciprocate along a feed screw 21 of a feed screw unit 20 supported by a column 10 when a drive unit 40 is operated, thereby causing the direct-acting manipulator 200 whose proximal end portion is coupled to the slider 30 to reciprocate vertically of the robot.

The direct-acting manipulator 200 includes a coupling member 210 which is fixed to the upper surface of the slider 30 of the direct-acting actuator 100 so as to be movable in unison with the slider. A first link 220 is coupled at its coupling portion (first horizontal revolute joint) 221 to the distal end of the coupling member 210 so as to be rotatable relatively to the coupling member 210, the coupling portion being provided at the inner end of the link 220. Also, a first servomotor 230, which is used to change the operative position of the first horizontal revolute joint, that is, to turn the first link 220 within a horizontal plane around a first swivel axis of the robot extending at right angles to the first horizontal revolute joint, is fixed to the coupling member 210 or the slider 30 by the use of a suitable means (not shown). Further, a second link 240 is coupled, at one end thereof, to a coupling portion (second horizontal revolute joint) 222 at the outer end of the first link 220 so as to be rotatable relative to the first link 220. Also, a second servomotor 250 for swiveling the second link 240 within a horizontal plane around a second swivel axis of the robot extending at right angles to the second horizontal revolute joint, is fixed to the first link 220 by the use of a suitable means (not shown). Moreover, a wrist portion (not shown) of the manipulator 200 is attached to the distal end of the second link 240, and an end effector (robot hand for transportation in the present embodiment, not shown) for various operations is attached to the wrist portion. Reference numeral 260 denotes a servomotor for controlling the posture of the wrist portion. Other servomotors for wrist portion posture control and a drive mechanism for opening and closing the robot hand are not shown.

Figure 3:
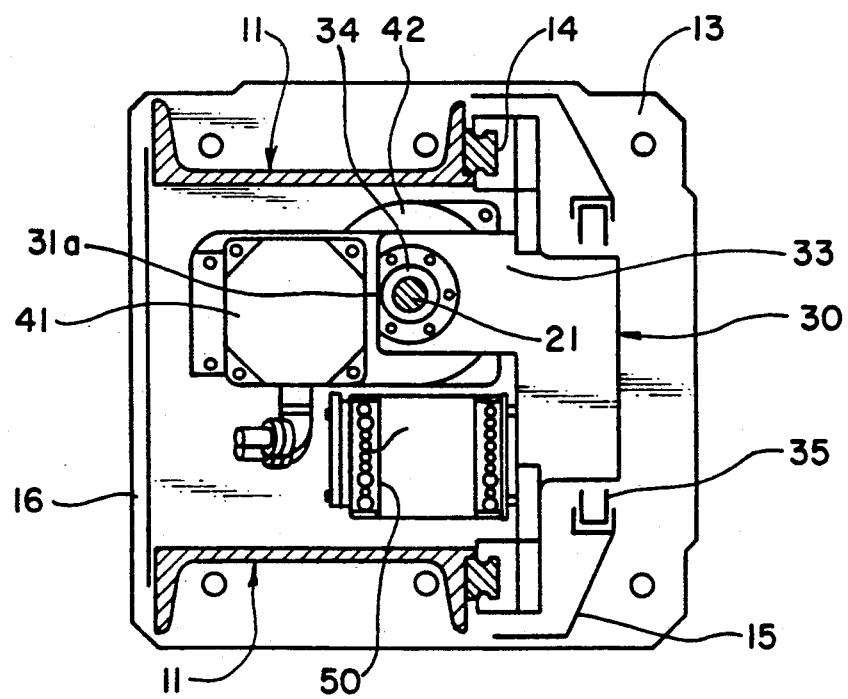
FIG. 3 is a schematic plan view of the directacting actuator taken along line III—III of FIG. 2.
Figure 2:
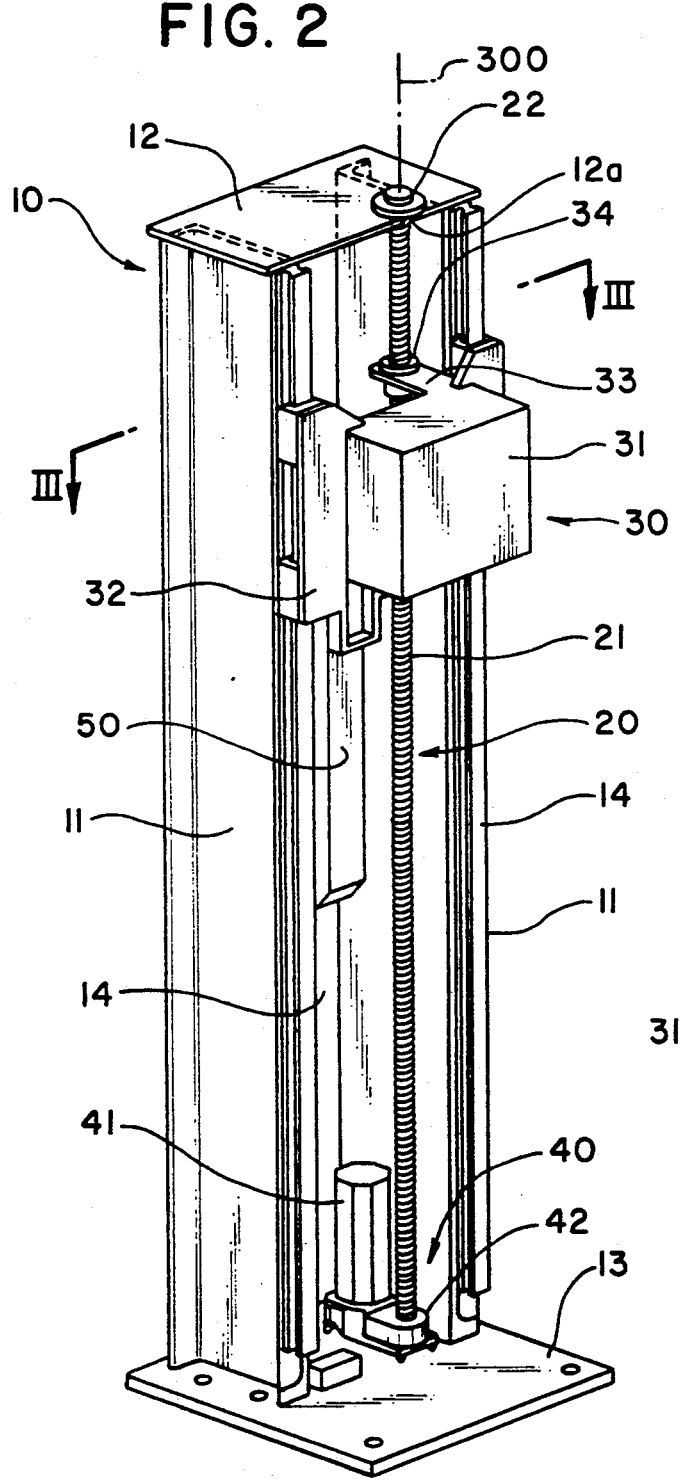
FIG. 2 is a schematic perspective view showing a direct-acting actuator of the FIG. 1 embodiment.
Figure 6:
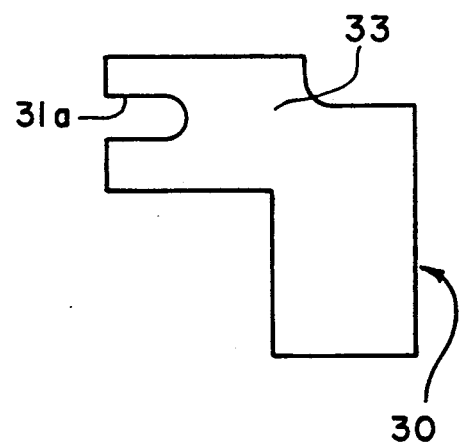
FIG. 6 is a plan view of the ball nut mounting plate of the robot of FIG. 1 with all other components removed for clarity.

Referring to FIGS. 2 and 3, the column 10 of the direct-acting actuator 100 has a pair of end walls 11 which extend parallel to a translation axis 300 of the robot and are spaced from each other. The upper and lower ends of each end wall 11 are fixed to a top plate 12 and a base plate 13, respectively. For example, each end wall 11 is formed of channel steel, and the top and base plates 12 and 13 are each formed of a steel plate. These elements 11 to 13 are welded to one another at their junctions, so that the column 10 is solid as a whole. The end walls 11 and the top and base plates 12 and 13 have their respective required thicknesses for mechanical strength high enough to bear the whole robot and an object to be transported. Front and rear covers 15 and 16 (FIG. 3) are disposed on the side facing the slider 30 of the column 10 and on the side away from the slider, respectively. These two covers cooperate with the end walls 11 to define a space in which the feed screw 21 and various elements mentioned later are housed.

A servomotor 41 is fixed to the upper surface of the base plate 13, and its output shaft (not shown) is coupled to the input side of a reduction gear (not shown) accommodated in a gear box 42 which is fixed to the upper surface of the base plate 13 by means of, e.g., bolts. The servomotor 41 cooperates with the reduction gear to constitute the drive unit 40 for the translation axis 300. The servomotor 41, along with the servomotors 230, 250 and 260 of the manipulator 200, internal measuring sensors of the actuator 100, and internal sensors (not shown) of the manipulator 200, are connected to a numerical control unit (not shown) for controlling the drive of the servomotors, by means of a cable group 51 (FIG. 3) supported by cable receiving hardware 50 which is fixed to the slider 30.

The feed screw unit 20 includes the feed screw preferably formed of the ball screw 21. A bearing unit 22, which supports the ball screw 21 in a manner permitting relative rotation and preventing relative axial movement, is attached to the upper end of the ball screw 21. The bearing unit 22 is removably fitted in a notch 12a which is formed in the side edge of the top plate 12 of the column 10 on the side facing the slider 30, so as to be in alignment with the translation axis 300 and extend through the top plate 12. The outer end of the notch 12a opens to the end face of the top plate 12 on the side facing the slider 30 so that the ball screw 21 can pass through the notch 12a. The lower end of the ball screw 21 is removably coupled to the reduction gear accommodated in the gear box 42.

The slider 30 includes a main body portion 31 which is integrally formed at its lower part with a pair of guide members 32 protruding outwardly from the opposite sides of the slider body 31. These guide members 32 are individually slidably engaged with a pair of guide rails 14 which are fixed individually to the end faces of the paired end walls 11 of the column 10 on the side facing the slider 30. Further, a plate member 33, projecting toward the ball screw 21 and extending traversely of the ball screw 21, is formed at the lower part of the slider body portion 31 integrally therewith. A notch 31a similar to the notch 12a is formed at the distal end edge of the plate member 33 on the side facing the ball screw 21, and its end opens to the end face of the plate member 33 on the side facing the ball screw 21. The slider 30 further includes a ball nut 34 which is threadedly engaged with the ball screw 21, and the ball nut 34 is fixed to the plate member 33 in a manner such that it is fitted in the notch of the plate member 33. Numeral 35 (FIG. 3) denotes a seal member which, fitted on each side face of the slider body 31, is slidable relatively to the front cover 15 of the column 10.

In the following, procedures of assembling the robot constructed above will be explained.

After the drive unit 40 is first disposed on the base plate 13 of the column 10, the guide members 32 are fitted individually on the guide rails 14, and the slider 30, previously fixedly fitted with the cable group 51 by means of the cable receiving hardware 50, is mounted on the column 10. Subsequently, the ball nut 34 is engaged with the ball screw 21, and the bearing unit 22 is mounted to the upper end of the ball screw 21. Then, the lower end portion of the ball screw 21 is diagonally inserted into the internal space of the column 10, and the ball screw 21 is then set upright so that the lower end portion of the ball screw 21 is fitted in the notch of the plate member 33 of the slider 30, and that the upper end portion of the ball screw 21 is fitted in the notch 12a of the top plate 12 of the column 10. Then, the lower end of the ball screw 21 is coupled to the reduction gear in the gear box 42 from above. Then, the bearing unit 22 is fixed to the top plate 12 in a manner such that it is fitted in the notch 12a. Subsequently, the ball nut 34 is fixed to the plate member 33, with the same nut fitted in the notch. Further, the front and rear covers 15 and 16 and the like are mounted, whereupon assembling the direct-acting actuator 100 is completed. In this manner, the feed screw 21 can be mounted from the slider side of the column 10, so that the actuator 100 can be assembled quickly and safely even in a narrow working space. Thereafter, the coupling member 210 of the manipulator 200 is fixed to the slider 30, the first and second links 220 and 240 are further coupled in succession, and the servomotors 230, 250 and 260 are mounted, whereupon assembling the robot is finished.

The operation of the horizontal revolute robot will now be described.

When the robot is operated, in response to a control output supplied from the numerical control unit of the robot, the servomotor 41 rotates at a required speed in a rotating direction corresponding to the control output. The rotary force of the motor is transmitted to the ball screw 21 through the reduction gear, thereby rotating the ball screw, so that the ball nut 34 in engagement with the ball screw and the slider 30 integral therewith are guided along the ball screw 21 by the guide rails 14, to ascend or descend smoothly for a required distance, in unison with the manipulator 200. Meanwhile, a feedback signal from the associated internal sensor of the actuator 100, which is indicative of the actual moved position of the slider 30 in the height direction of the robot, is supplied to the numerical control unit. The numerical control unit performs conventional feedback control, thereby positioning the slider 30 and the manipulator 200 in required vertical positions. Further, the servomotors 230 and 250 are feedback-controlled in like manner by the numerical control unit. As a result, the first and second links 220 and 240 of the manipulator 200 rotate through a required angle within a horizontal plane, around the first and second pivotal axes, respectively, thereby positioning the wrist portion of the manipulator 200 in a required position within a horizontal plane. Then, the servomotor 260 and the like are controlled in like manner, so that the posture of the wrist portion, and hence, that of the robot hand, are controlled. After all, the robot hand assumes a required position and posture in the robot installation space. Moreover, since the actuator 100 can be moved close to the floor surface on which the robot is installed, the range of action of the robot is wide. Further, if necessary, the robot hand is controlled to be closed or opened in the conventional manner, thereby grasping or releasing the object to be transported.

The column 10 supports moving parts, such as the slider 30, of the actuator 100 and the manipulator 200 with the aid of the ball screw 21 and the top plate 12, and satisfactorily stands various moments that are produced with the vertical movement of the actuator 100 and the swivel motion of the manipulator 200. Thus, the column 10 resists various forces of action acting in the axial direction of the ball screw 21, so that no special axial forces act on the gear box 42 and the reduction gear accommodated therein. In this respect, the gear box 42 and the reduction gear are made compact in size and light in weight.

The present invention is not limited to the embodiment described above, and various modifications may be made. Although the transportation robot has been described by way of example in the above embodiment, the robot may be modified so that it can perform any other operations. Although the above described robot is provided with the series-connected manipulator including the two horizontal revolute joints, a series- or parallel-connected manipulator may alternatively be used including a required number of horizontal revolute joints.

We claim:

1. A horizontal revolute robot, comprising:
a direct-acting actuator; and
a manipulator including at least one horizontal revolute joint and arranged for swivel motion within a horizontal plane;
said direct-acting actuator including:
a vertically extending feed screw;
a column including an upper plate member rotatably supporting said feed screw at an upper end of said feed screw and a lower plate member spaced vertically from said upper plate member;
a drive unit disposed on said lower plate member and coupled to a lower end of said feed screw for rotatively driving said feed screw; and
a slider operatively coupled to said feed screw and movable along said feed screw with rotation of said feed screw;
wherein said manipulator is coupled at its proximal end portion to said slider so as to be movable vertically of the robot in unison with said slider;
wherein said slider includes a ball nut mounting plate extending transversely of said ball screw, a bearing unit for supporting said ball screw for relative rotation being mounted to an upper end of said ball screw, said upper plate member being disposed transversely of said ball screw and formed with a first notch which opens to an end face of said upper plate member at a side facing said slider, said bearing unit being removably fitted in said first notch, said ball nut mounting plate of said slider being formed with a second notch which opens to an end face of said ball nut mounting plate at a side facing said ball screw, said ball screw being removably fitted in said second notch.

2. A horizontal revolute robot according to claim 1, wherein said feed screw is a ball screw, said slider including a ball nut threadedly engaged with said ball screw.

3. A horizontal revolute robot according to claim 1, wherein said manipulator includes link means and a coupling member constituting said proximal end portion of said manipulator and movable in unison with said slider, said link means being coupled to said coupling member for swivel motion relative to said coupling member by means of said at least one horizontal revolute joint corresponding thereto.

4. A horizontal revolute robot according to claim 3, wherein said link means includes a plurality of links, each two adjacent ones of said plurality of links being coupled to each other for swivel motion by means of said at least one horizontal revolute joint corresponding thereto.

5. A horizontal revolute robot according to claim 1, wherein said direct-acting actuator includes a pair of vertically disposed guide rails slidably mounting said slider.

* * * * *